United States Patent
Warnes

(10) Patent No.: US 8,132,886 B2
(45) Date of Patent: Mar. 13, 2012

(54) ADJUSTING THE CALIBRATION OF A RECORDING APPARATUS WITH RECORDING HEAD MOVEMENT CHANGES

(75) Inventor: Allan Warnes, North Vancouver (CA)

(73) Assignee: Eastman Kodak Company NJ (US)

( * ) Notice: Subject to any disclaimer, the term of this patent is extended or adjusted under 35 U.S.C. 154(b) by 457 days.

(21) Appl. No.: 12/436,827

(22) Filed: May 7, 2009

(65) Prior Publication Data

US 2010/0283813 A1 Nov. 11, 2010

(51) Int. Cl.
*B41J 29/393* (2006.01)
(52) U.S. Cl. .......................................................... 347/19
(58) Field of Classification Search .................. None
See application file for complete search history.

(56) References Cited

U.S. PATENT DOCUMENTS

| | | | |
|---|---|---|---|
| 6,968,782 | B2 | 11/2005 | Cummings |
| 7,456,379 | B2 | 11/2008 | Neufeld et al. |
| 2003/0098985 | A1 | 5/2003 | Horobin |
| 2005/0115430 | A1 | 6/2005 | Cummings |
| 2005/0243120 | A1 | 11/2005 | Detmers et al. |
| 2008/0218578 | A1* | 9/2008 | Ishihara et al. ............... 347/104 |
| 2008/0236426 | A1 | 10/2008 | Cummings et al. |
| 2008/0299470 | A1* | 12/2008 | Cummings et al. ............. 430/30 |

FOREIGN PATENT DOCUMENTS

| | | |
|---|---|---|
| EP | 0 325 415 A2 | 7/1989 |
| WO | WO 2007/019677 A1 | 2/2007 |

* cited by examiner

*Primary Examiner* — Stephen Meier
*Assistant Examiner* — Tracey McMillion
(74) *Attorney, Agent, or Firm* — Nelson Adrian Blish

(57) ABSTRACT

The present invention relates to a method for changing a calibration of a recording apparatus (10) to adjust for geometric distortion, comprising: providing a media support (12) for receiving recording media (17); providing a carriage (18) adapted for moving along a path; providing a recording head (16) on the carriage; operating the recording head to form a pattern of image features on the recording media while the recording media is positioned with a first orientation (50A) on the media support; positioning the recording media with a second orientation (50B) on the media support, wherein the second orientation is different from the first orientation; detecting distortion in the pattern of image features while the recording media is positioned with the second orientation on the media support; and adjusting movement of the carriage in accordance with the detected distortion.

24 Claims, 12 Drawing Sheets

ADJUSTING THE CALIBRATION OF A RECORDING APPARATUS WITH RECORDING HEAD MOVEMENT CHANGES

CROSS REFERENCE TO RELATED APPLICATIONS

Reference is made to commonly-assigned copending U.S. patent application Ser. No. 12/436,815 (now U.S. Publication No. 2010/0284040) filed May 7, 2009, entitled CALIBRATION OF A RECORDING APPARATUS, by Allan Warnes; and U.S. patent application Ser. No. 12/436,820 now U.S. Publication No. 2010/0284041) filed May 7, 2009, entitled IMPROVED GEOMETRIC CORRECTION OF A RECORDING APPARATUS, by Allan Warnes; the disclosures of which are incorporated herein.

FIELD OF THE INVENTION

The invention relates to recording apparatus for forming images on recording media. More particularly, the invention relates to calibration of such recording apparatus.

BACKGROUND OF THE INVENTION

Various recording apparatus are used to form images on recording media. For example, computer-to-plate systems (also known as CTP systems) are used to form images on printing plates. A plurality of imaged printing plates is subsequently provided to a printing press where images from the printing plate are transferred to paper or other suitable surfaces. It is important that the plurality of images be accurately aligned with respect to one another to ensure an accurate registration among the images. It is important that each image be geometrically correct and free from distortion to ensure desired quality characteristics of the finished printed article. Geometric characteristics of an image can involve, but are not limited to: a desired size of an image portion or a desired alignment of one image portion with another image portion.

The geometric accuracy of the images formed on a recording media is dependant on numerous factors. For example, images can be formed on a recording media by mounting the media on a support and directing imaging beams towards the media to form the images thereupon. Images can be formed by scanning the recording media with the imaging beams during a plurality of scans. The positioning accuracy of the imaging beams with respect to the recording media impacts the geometric correctness of the formed images. Deviations in required positioning of the imaging beams during each scan can lead to imaging errors.

In order to reduce imaging errors, recording systems are typically calibrated. Calibration images are typically formed on recording media and are analyzed to determine deviations. Deviations associated with a desired geometric characteristic of a calibration image are typically corrected by performing various adjustments in the recording systems. The adjustments can be electronic or mechanical in nature. Analysis of the calibration images is typically performed on specialized and dedicated equipment that can include various image capture sensors. For example CCD sensors can be used to capture various images of the calibration images and a controller can be used to analyze the captured images and determine calibration information therefrom.

Specialized and dedicated calibration systems are costly and require regular calibration themselves to insure their integrity. Such systems are typically employed at the factory where the recording systems are manufactured. Factory based calibration systems complicate the calibration of a recording system in the field. For instance, test images would need to be made in the field and then shipped to another site for analysis. This increases the time required for calibration and increases the chances for imaging errors to occur. There remains a need for effective and practical methods and systems that permit the calibration of a recording apparatus to correct geometric distortions of images formed on a recording media by the recording apparatus.

SUMMARY OF THE INVENTION

Briefly, according to one aspect of the present invention, the present invention relates to a method for changing a calibration of a recording apparatus to adjust for geometric distortion, comprising: providing a media support for receiving recording media; providing a carriage adapted for moving along a path; providing a recording head on the carriage; operating the recording head to form a pattern of image features on the recording media while the recording media is positioned with a first orientation on the media support; positioning the recording media with a second orientation on the media support, wherein the second orientation is different from the first orientation; detecting distortion in the pattern of image features while the recording media is positioned with the second orientation on the media support; and adjusting movement of the carriage in accordance with the detected distortion.

According to another aspect of the present invention, recording apparatus, comprising: a media support comprising a cylindrical surface adapted to receive recording media; a recording head; a carriage adapted for moving the recording head along a path relative to a rotational axis of the media support; a sensor; and a controller configured to: operate the carriage to move the recording head along the path while forming a pattern of image features on the recording media positioned on the cylindrical surface with a first orientation; operate the sensor to detect sub-scan distortion in the pattern of image features while the recording media is positioned on the cylindrical surface with a second orientation, the second orientation being different from the first orientation; and adjust a speed of the carriage in accordance with the detected sub-scan distortion.

BRIEF DESCRIPTION OF THE DRAWINGS

Embodiments and applications of the invention are illustrated by the attached non-limiting drawings. The attached drawings are for purposes of illustrating the concepts of the invention and may not be to scale.

DETAILED DESCRIPTION OF THE INVENTION

Throughout the following description specific details are presented to provide a more thorough understanding to persons skilled in the art. However, well-known elements may not have been shown or described in detail to avoid unnecessarily obscuring the disclosure. Accordingly, the description and drawings are to be regarded in an illustrative, rather than a restrictive, sense.

Figure 1:
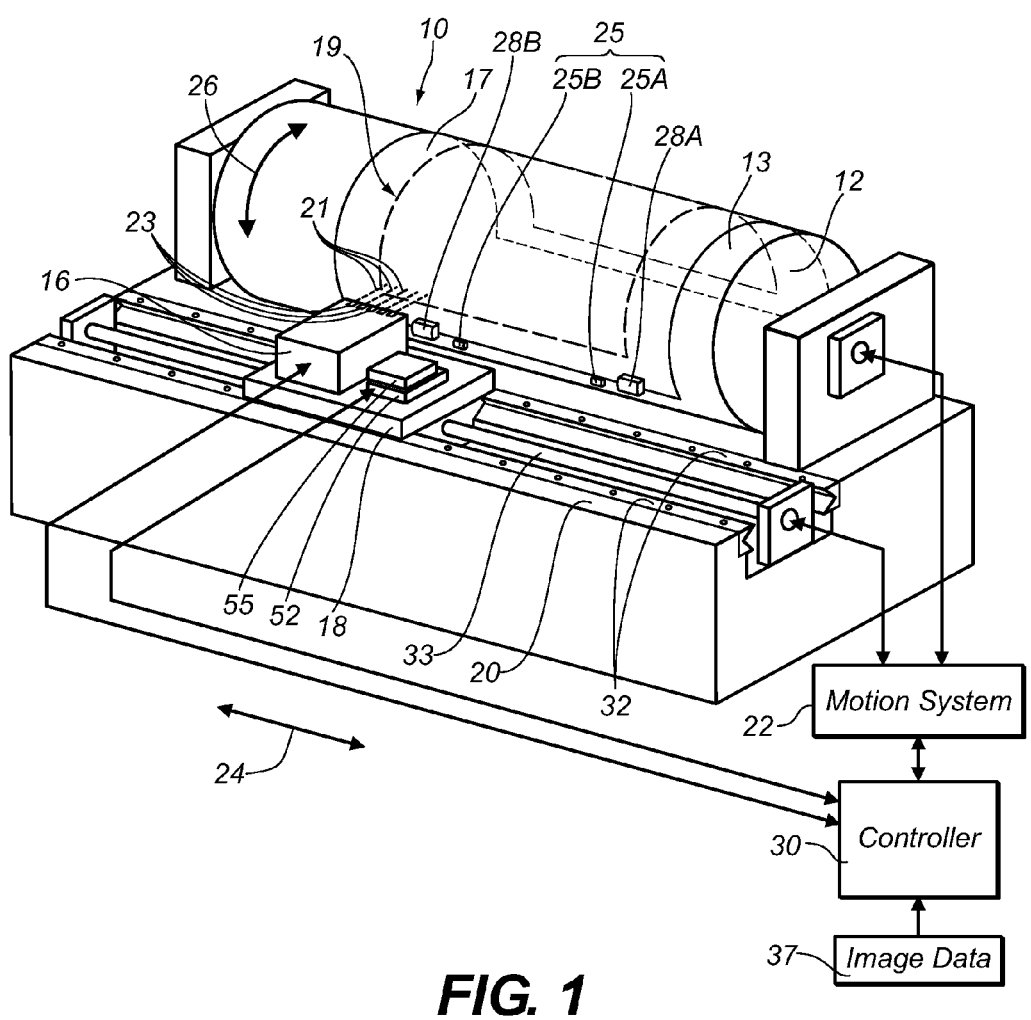
FIG. 1 is partial schematic view of a recording apparatus employed in an example embodiment of the invention.

FIG. 1 schematically shows a recording apparatus 10 for forming an image 19 (i.e. schematically represented by broken lines) on a recording media 17 as per an example embodiment of the invention. Recording media 17 can include various media comprising a surface suitable for forming image 19 thereupon. Recording apparatus 10 includes a media support 12, which in this example embodiment is configured as per an external drum configuration. Other embodiments of the invention can include other forms of media supports configured according to internal drum configurations or flat-bed configurations for example. In this example embodiment, recording media 17 is supported on a cylindrical surface 13 of media support 12. One or more edge portions of recording media 17 are secured to cylindrical surface 13 by clamps 28A and 28B. Other example embodiments of the invention can secure recording media 17 to media support 12 by other methods. For example, a surface of recording media 17 can be secured to cylindrical surface 13 by various methods including providing a low-pressure source between the surfaces. Media support 12 is movably coupled to support 20. In this example embodiment, media support 12 is rotationally coupled to support 20. In this example embodiment, media support 12 includes a plurality of registration features 25 that include registration feature 25A and registration feature 25B.

Recording apparatus 10 includes recording head 16, which is movable relative to media support 12. In this example embodiment of the invention, media support 12 is adapted to move by rotating about its rotational axis. In this example embodiment, recording head 16 is mounted on movable carriage 18. Carriage 18 is operated to cause recording head 16 to be moved along a path aligned with a rotational axis of media support 12. Motion system 22 is employed to provide relative movement between recording head 16 and media support 12. Motion system 22 (which can include one or more motion systems) can include any suitable drives needed for the required movement. In this example embodiment of the invention, motion system 22 is used to move media support 12 along a path aligned with main-scan axis 26 and is used to move recording head 16 along a path aligned with sub-scan axis 24. Guide system 32 is used to guide carriage 18 which is moved under the influence of transmission member 33. In this example embodiment of the invention, transmission member 33 includes a precision screw mechanism. In other example embodiments, a linear motor is employed to move recording head 16. In some example embodiments, a plurality of recording heads 16 is moved such that each of the recording heads 16 is moved independently of each other. In some example embodiments, a plurality recording heads 16 are moved in tandem.

Those skilled in the art will realize that various forms of relative movement between recording head 16 and media support 12 can be used in accordance with the present invention. For example, in some cases recording head 16 can be stationary while media support 12 is moved. In other cases, media support 12 is stationary and recording head 16 is moved. In still other cases, both the recording head 16 and the media support 12 are moved. One or both of recording head 16 and media support 12 can reciprocate along corresponding paths. Separate motion systems can also be used to operate different systems within recording apparatus 10.

In this example embodiment, recording head 16 includes a radiation source (not shown), such as a laser. In various example embodiments, recording head 16 includes one or more individually addressable recording channels 23, each of the recording channels 23 being controllable to form various image portions on recording media 17. A plurality of recording channels 23 can be arranged in different configurations including one dimensional or two dimensional array configurations. In this example embodiment, recording head 16 is controllable to emit various imaging beams 21 while scanning over recording media 17 to form image 19. Imaging beams can be image-wise modulated according to image data 37 specifying the image to be written. In this example embodiment, one or more of the recording channels 23 are driven appropriately to produce imaging beams 21 with active intensity levels wherever it is desired to form an imaged portion of image 19. Recording channels 23 not corresponding to the imaged portions are driven so as not to image corresponding areas. Each of the recording channels 23 is controllable to form a unit element of image typically referred to as an image pixel or an image dot on recording media 17 in accordance with information provided by image data 37. Various image pixels can be combined with other image pixels to form various features of image 19. In some example embodiments, image pixels can be arranged in various patterns including halftone patterns, stochastic patterns and hybrid patterns (i.e. patterns that include halftone and stochastic patterns). In some example embodiments, image pixels can be arranged in various non-screened patterns (e.g. grid patterns or patterns of various fiducials).

Image 19 can be formed on recording media 17 by different methods. For example, recording media 17 can include a modifiable surface, wherein a property or characteristic of the modifiable surface is changed when irradiated by an imaging beam 21. An imaging beam 21 can be used to ablate a surface of recording media 17 to form an image 19. An imaging beam 21 can be used to facilitate a transfer of an image forming material to a surface of recording media 17 to form an image 19 (e.g. a thermal transfer process). An imaging beam 21 can undergo a direct path from a radiation source to the recording media 17 or can be deflected by one or more optical elements towards the recording media 17. In some example embodiments of the invention, image 19 is formed with other image forming techniques. For example, in some inkjet processes, recording channels 23 can be adapted to emit image forming material towards recording media 17 to form image 19 thereon.

Groups of recording channels 23 can form an image swath having a width related to the distance between a first pixel imaged and a last pixel imaged during a given scan. Recording media 17 is typically too large to be imaged within a single image swath. Multiple imaged swaths are typically formed to complete an image on recording media 17.

Recording apparatus 10 includes sensor 52 and illuminator 55. Sensor 52 is adapted to detect the presence of various entities including, but not limited to, various portions of image 19. Illuminator 55 is adapted to illuminate various entities and can optionally be employed during a detection of these entities.

Controller 30, which can include one or more controllers is used to control one or more systems of recording apparatus 10 including, but not limited to, various motion systems 22 used by media support 12 and carriage 18. Controller 30 can also control media handling mechanisms that can initiate the loading or unloading of recording media 17 to or from media support 12 respectively. Controller 30 can also provide image data 37 to recording head 16 and control recording head 16 to emit-imaging beams 21 in accordance with this data. Controller 30 can also control sensor 52 and illuminator 55. Various systems can be controlled using various control signals or implementing various methods. Controller 30 is programmable and can be configured to execute suitable software and can include one or more data processors, together with suitable hardware, including by way of non-limiting example: accessible memory, logic circuitry, drivers, amplifiers, A/D and D/A converters, input/output ports and the like. Controller 30 can comprise, without limitation, a microprocessor, a computer-on-a-chip, the CPU of a computer or any other suitable microcontroller. Controller 30 can consist of several different or logical units, each of which is dedicated to performing a particular task.

Figure 2:
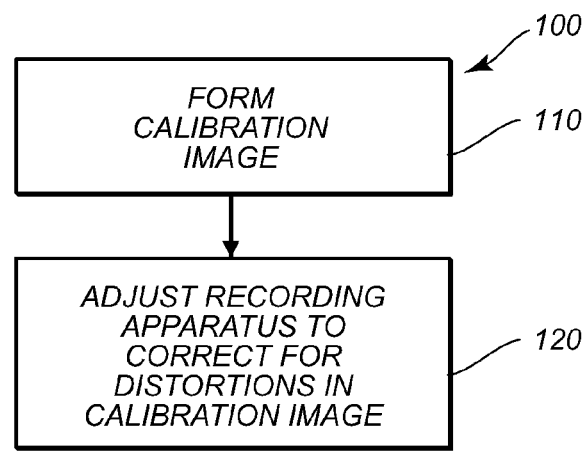
FIG. 2 shows a flow chart representative of a method for calibrating a recording apparatus as employed by an example embodiment of the invention.
Figure 3:
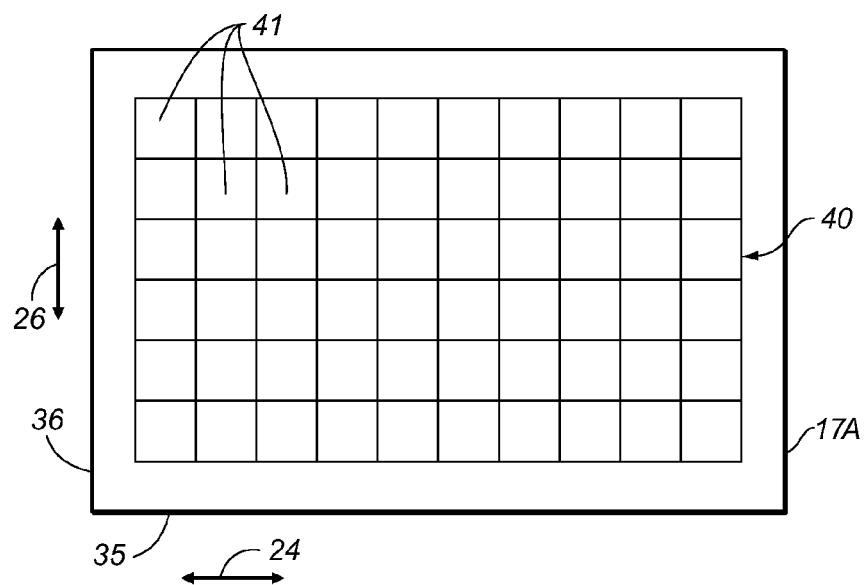
FIG. 3 is a schematic plan view of a target image to be formed on a recording media.

FIG. 2 shows a flow chart representative of a method 100 of calibrating a recording apparatus as employed by an example embodiment of the invention. The various steps illustrated in FIG. 2 are described with reference to recording apparatus 10 shown in FIG. 1. This is for the purposes of illustration only and other suitable recording apparatus can be used in the present invention. Recording apparatus 10 can used to form various desired images on various recording media 17. In this example embodiment, it is desired that recording apparatus 10 be operated to form a target image 40 as schematically represented in FIG. 3. In this example embodiment, target image 40 comprises a precise grid pattern made up of target cells 41 which are defined by image boundaries of a desired size. In this example embodiment, cells 41 are square shaped. Target image 40 is represented in a desired alignment with various edges of recording media 17 which is shown in an unwrapped or "flat" orientation for clarity. Specifically, it is desired to form target image 40 referenced with respect to a first edge 35 and a second edge 36 of a recording media 17A. In this example embodiment, first edge 35 is to be aligned with sub-scan axis 24 and second edge 36 is to be aligned with main-scan axis 26. In other example embodiments of the invention, it may be desired to align various parts of target image 40 with various other registration points of recording media 17A. In this example embodiment, geometric characteristics of target image 40 are described in relationship with main-scan axis 26 and sub-scan axis 24.

Target image 40 is represented by various image data that is provided to controller 30 to form an image on recording media 17A. In this example embodiment of the invention, controller 30 controls motion system 22 to create relative movement between recording head 16 and recording media 17A during the imaging. In this example embodiment of the invention, recording head 16 is translated in a coordinated manner with the rotation of media support 12 to form various image swaths. In some example embodiments, the image swaths are ring-like or circular image swaths formed with circular scanning techniques. In this example embodiment, the image swaths are spiral or helical image swaths that are formed with helical scanning techniques.

Figure 4:
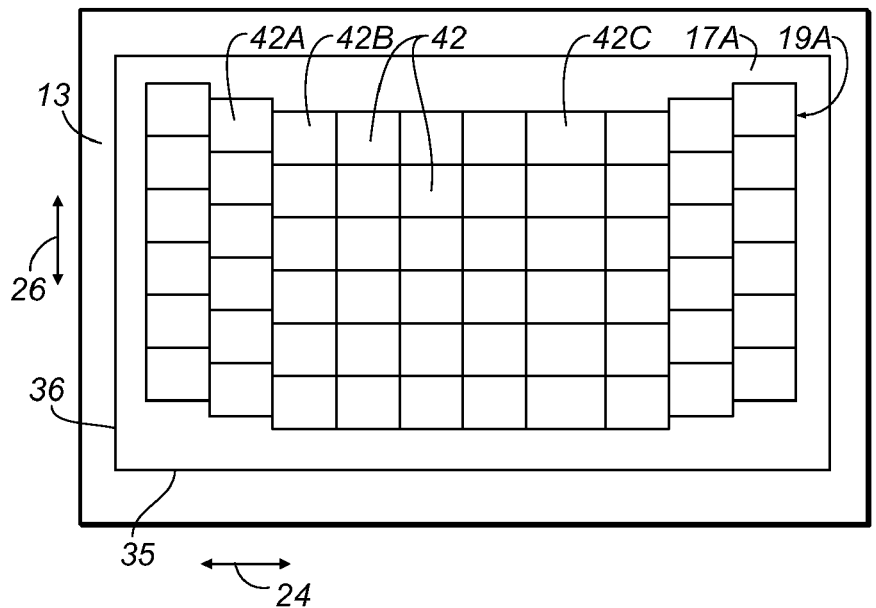
FIG. 4 is a schematic plan view of a calibration image formed on recording media in response to the desired imaging of the target image of FIG. 3.

In step 110, recording apparatus 10 is operated to form a calibration image in response to the image data representative of target image 40. FIG. 4 schematically shows an example calibration image 19A formed on recording media 17A in response to the desired imaging of target image 40 by recording head 16. For clarity, recording media 17A and cylindrical surface 13 are depicted in a "flat" orientation. Calibration image 19A includes a plurality of imaged cells 42 corresponding to target cells 41. As shown in FIG. 4, calibration image 19A is distorted and does not correspond exactly to target image 40. Various imaging distortions appear in different areas of calibration image 19A. Various imaged cells 42 do not correspond exactly to corresponding target cells 41 in target image 40. For example, a column of imaged cells 42 including imaged cell 42A is shifted along a direction of main-scan axis 26 with respect to a column of imaged cells 42 that include imaged cell 42B. FIG. 4 also shows that various imaged cells 42 including imaged cell 42C are elongated in size along a direction of sub-scan axis 24 as compared to corresponding target cells 41. It is understood that image distortions are not limited to image cells 42A and 42C, and other imaged cells 42 in calibration image 19A can be also distorted in similar or different manners.

Positional and size distortions can occur for several reasons. For example, overall scaling problems can arise from temperature variances. One or more of recording media 17, media support 12 and various transmission components such as transmission member 33 can include different material compositions that have different coefficients of thermal expansion. Different expansion rates can lead to scaling problems. Carriage 18 moves along a guide system 32 that is not perfect in form. Guide system 32 can include various suitable guide tracks and guided members that can include sliding or rotational moving bearing elements. Imperfections can be present even when high precision components are used. Mechanical factors such as play between the guided members and the guide tracks, the straightness of the guide tracks, and sag in support 20 can lead to imaging imperfections.

As carriage 18 moves along a path aligned with sub-scan axis 24, these imperfections can subject recording head 16 to various additional movements that can adversely impact the projection of imaging beams 21 onto recording media 17. Imaging imperfections can be visualized with reference to FIGS. 5A, 5B, and 5C.

Figure 5A:
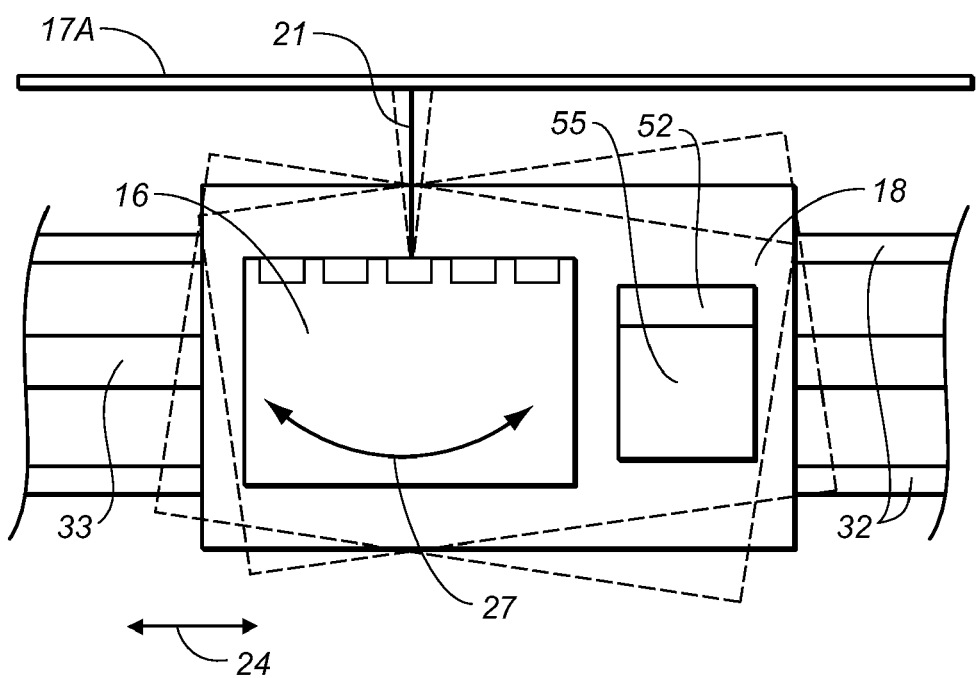
FIG. 5A shows an example of sub-scan distortion caused by a yawing movement of the recording head shown in FIG. 1.

FIG. 5A shows a possible cause for sub-scan distortions in the projection of imaging beams 21 onto recording media 17A. In this case, carriage 18 undergoes small yawing rotations (exaggerated for clarity) along yaw directions 27 as it moved along a path aligned with sub-scan axis 24. This causes variations in the projection of imaging beams 21 onto recording media 17A which can cause distortion of formed images along a sub-scan direction. Yawing movements of carriage 18 can arise for numerous reasons including play in guide system 32. Further, imperfections in other components can lead to sub-scan deviations. For example, transmission member 33 can comprise a precision lead screw, which can have slight pitch irregularities at various points along its length. Pitch irregularities can cause sub-scan distortions in the formed images.

Figure 5B:
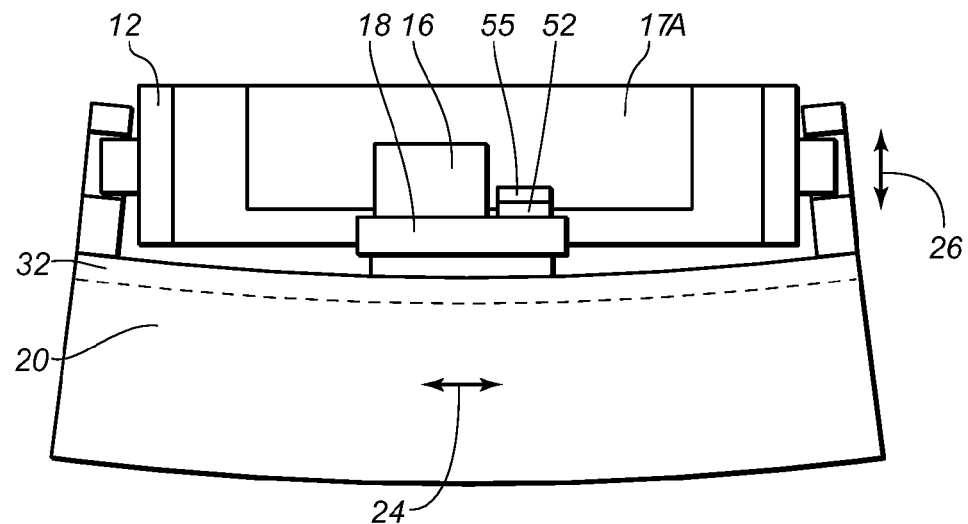
FIG. 5B shows an example of main-scan distortion caused by non-straightness in the guide system of the recording apparatus shown in FIG. 1.
Figure 5C:
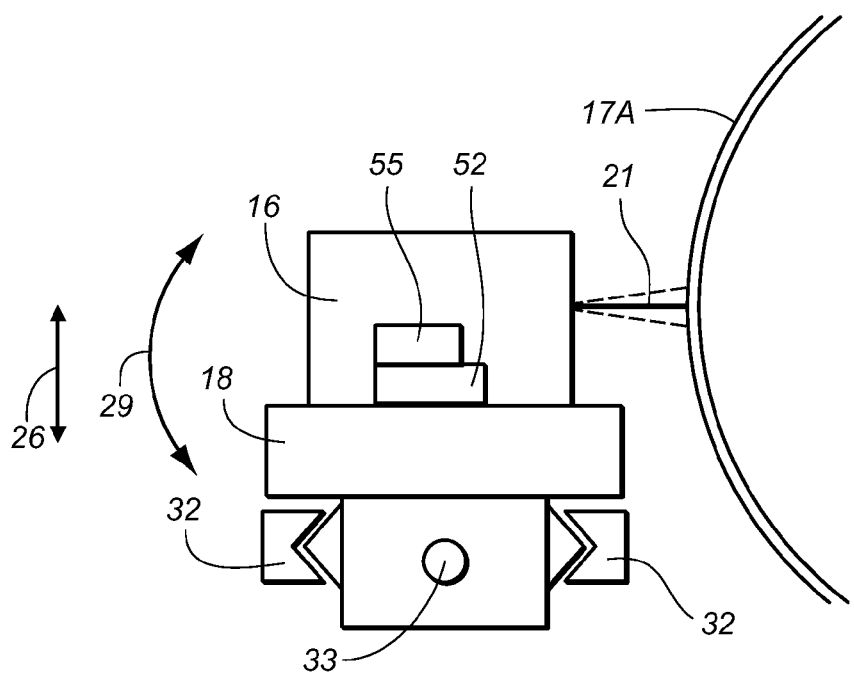
FIG. 5C shows an example of main-scan distortion caused by a pitching movement of the recording head shown in FIG. 1.

FIGS. 5B and 5C show possible causes for main-scan distortions in the projection of imaging beams 21 onto recording media 17A. Main-scan distortions can arise for different reasons. For example, as carriage 18 moves along guide system 32 it may undergo various displacements along a direction aligned with main-scan axis 26 as shown in FIG. 5B. These displacements have been exaggerated for clarity in FIG. 5B. These displacements can be caused by various factors, which can include deviations in straightness of the guide tracks. Deviations in the straightness of the guide tracks can arise from various causes including gravitational sag in the tracks and gravitational sag in support 20. Gravitational sag can adversely impact a main-scan positioning accuracy of the imaging beams 21. Main-scan distortions can be caused as carriage 18 undergoes small pitching movements (i.e. exaggerated for clarity in FIG. 5C) along pitch directions 29 as recording head 16 is moved along a path aligned with sub-scan axis 24. Pitch displacements can be caused by numerous reasons including play in guide system 32. Those skilled in the art will realize that the described image distortions are exemplary in nature and that other types of distortion can occur.

Referring back to FIG. 2, recording apparatus 10 is adjusted to correct for the distortions in calibration image 19A in step 120. Distortions can be corrected by various methods. In some example embodiments of the invention, main-scan distortions such as the shifts between imaged cells 42A and 42B can be corrected by adjusting an activation timing of various portions of the recording channels 23. Although the activation of a given recording channel 23 to form or not form an image pixel is dependent on image data, the timing of the activation of the given recording channel 23 or group of recording channels 23 can be adjusted. Adjustments of the activation timing of various recording channels 23 can be used to delay or advance the activation of those recording channels to form or not form one or more image pixels. Various recording channels 23 can be controlled to offset a first portion of an image swath relative to an additional portion of the imaged swath along a main-scan direction. Various recording channels 23 can be controlled to offset a portion of a given image swath from a portion of an additional image swath along a main-scan direction. A portion of an image swath can include the entirety of the imaged swath. The activation timing of various recording channels 23 within recording head 16 can be adjusted at various points as recording head 16 is moved along a path aligned with sub-scan axis 24. Activation timing adjustments can be made to various recording channels 23 when recording head 16 is positioned at various sub-scan locations that correspond to various distortions in regions of calibration image 19A. In this example embodiment of the invention, activation-timing changes are made independently of image data. In other example embodiments, the image data is manipulated to achieve a similar effect. Controller 30 can be configured to provide signals to recording head 16 to adjust activation timing of some or all of the recording channels 23 to compensate for expected image distortions corresponding to a particular sub-scan positioning of recording head 16. Motion system 22 can include suitable sensors or encoders (not shown), which can generate various signals representative of a position of recording head 16 and/or media support 12. In some example embodiments of the invention, these signals can be used by controller 30 to adjust activation timings of various recording channels 23 at various positions along the path of travel of recording head 16. In some example embodiments, controller 30 tracks the position of recording head 16 using open loop control techniques.

Sub-scan distortions such as elongated imaged cells 42C can be corrected by various methods. In some example embodiments of the invention, the movement of carriage 18 is adjusted. In some example embodiments of the invention, the movement of transmission member 33 is adjusted. Adjusting the movement of carriage 18 or transmission member 33 can include adjusting a speed of carriage 18 or transmission member 33. For example, in a drum based recording system (e.g. recording apparatus 10) spiral or helical image swaths are formed as the carriage 18 is translated while media support 12 is rotated. By adjusting the speed of transmission member 33 or carriage 18, the pitch of the helical swaths can be adjusted to scale the image to a desired size. In some example embodiments of the invention, uniform speed adjustments can be used to adjust the overall size of a formed image. In some example embodiments of the invention, non-uniform speed adjustments can be used to adjust the size of a portion of the formed image. For example, adjusting a speed of a transmission member 33 at various points along the movement path of carriage 18 can be used to correct image distortions corresponding to those points. Adjusting a speed of a transmission member 33 at various points along the movement path of carriage 18 can be used to correct for pitch discrepancies in transmission member 33. Adjusting a speed of transmission member 33 at various points along the movement path of carriage 18 can be used to correct yaw displacements associated with a particular positioning of recording head 16. Controller 30 can be programmed to provide signals to motion system 22 to adjust a movement of carriage 18 or transmission member 33. In some example embodiments of the invention, sensor or encoder signals can be used to assist controller 30 in adjusting a movement of carriage 18 or transmission member 33 at various positions along the path of travel of recording head 16.

Imaging corrections including activation timing adjustments and/or movement adjustments are typically determined on dedicated equipment at the factory at given point in time. A recalibration of recording apparatus 10 may be needed at a future time for various reasons. For example, environmental temperature changes can vary from the conditions that the initial calibration was performed in. Various components in motion systems 22 and guide system 32 can wear with use and reduce the precision and accuracy of these systems. Structural elements like support 20 can creep with time due to various loading conditions. Creep in structural elements can be a factor especially in larger recording systems. These factors and others can act to alter a desired alignment between the imaging beams 21 emitted by recording head 16 and the recording media 17, thus reducing the integrity of the images formed by recording head 16.

Figure 6:
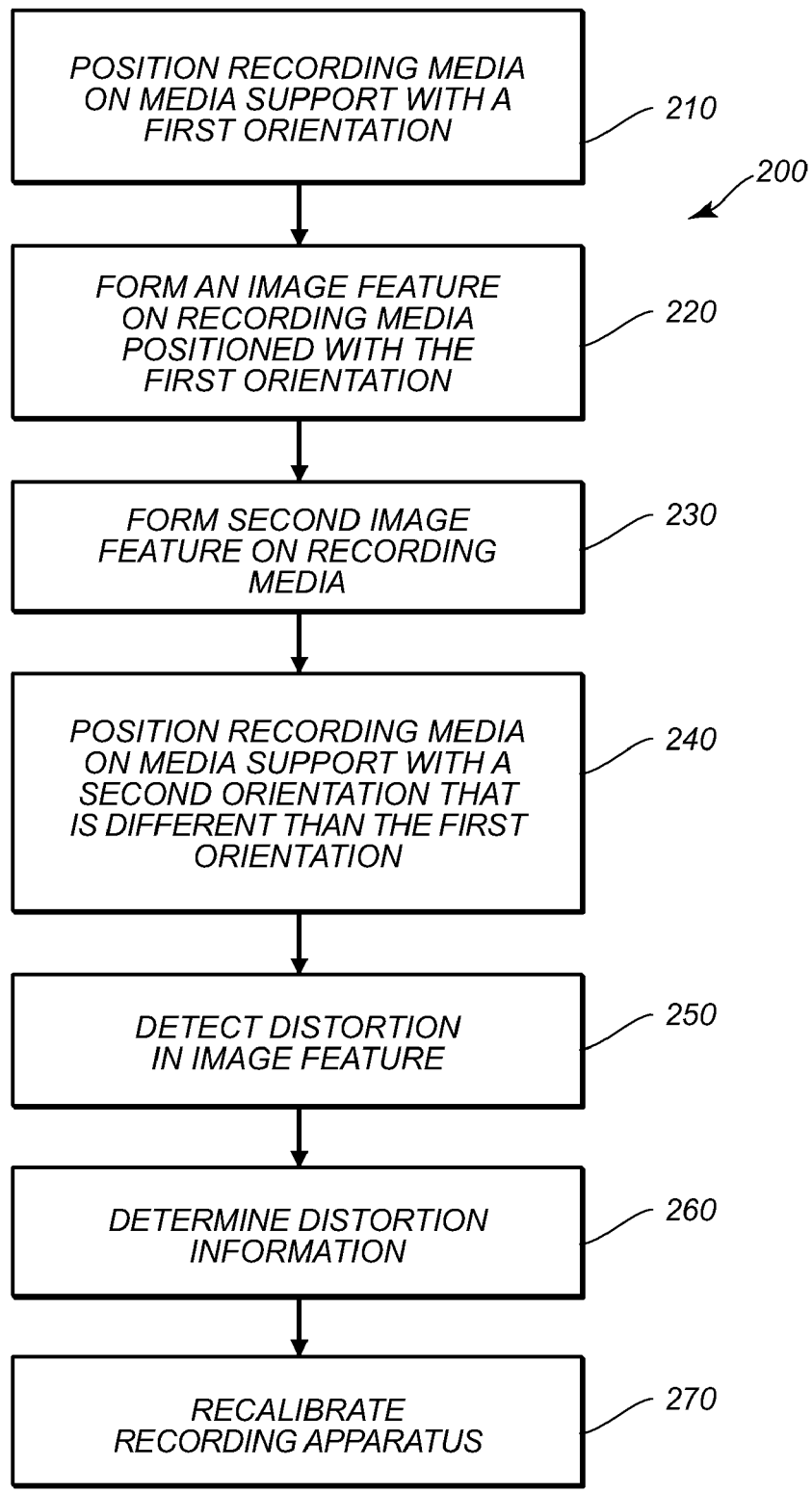
FIG. 6 shows a flow chart representing a method for adjusting a calibration of the recording apparatus of FIG. 1 as per an example embodiment of the invention.
Figure 7A:
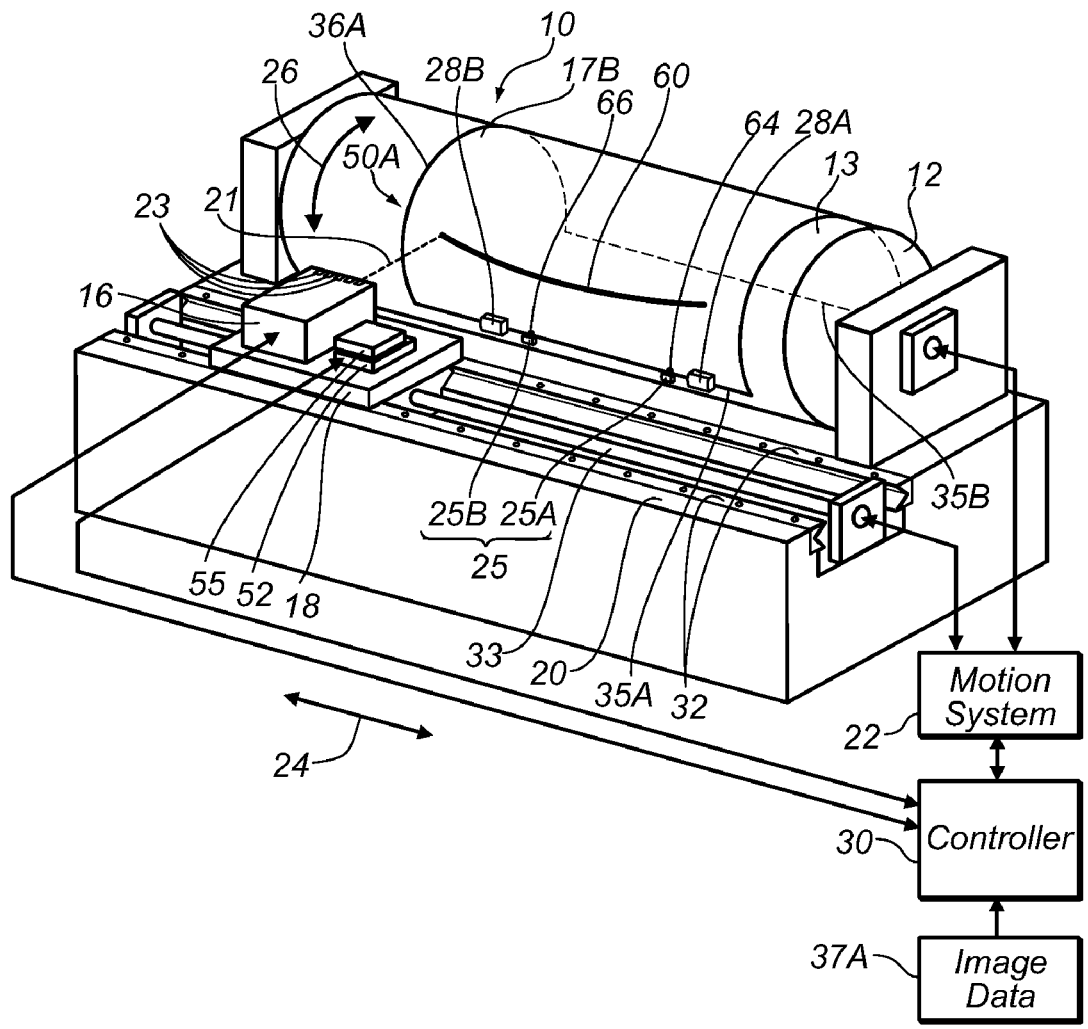
FIG. 7A shows an example embodiment of the invention which includes the formation of a first image feature on a recording media positioned with a first orientation on the media support of the recording apparatus of FIG. 1.

FIG. 6 shows a flow chart representing a method 200 for adjusting a calibration of a recording apparatus as per an example embodiment of the invention. The various steps illustrated in FIG. 6 are described with reference to recording apparatus 10 shown in FIG. 1. This is for the purposes of illustration only and other suitable recording apparatus can be used in the present invention. In accordance with step 210, a recording media 17B is positioned on media support 12 with a first orientation. FIG. 7A shows a positioning of recording media 17B with a first orientation 50A on the media support 12 of recording apparatus 10 as per an example embodiment of the invention.

In this example embodiment of the invention, recording media 17B is suitably positioned on media support 12 to allow recording head 16 to form an image on a surface of recording media 17B. In this example embodiment, recording media 17B is positioned in the first orientation 50A by aligning a first edge 35A of recording media 17B with the plurality of registration features 25 located on media support 12. In some example embodiments, each of the registration features 25 can include a surface adapted for contact with first edge 35A to align recording media 17B with a first orientation 50A that is suitable for the undertaking of image-forming actions. In this example embodiment, first orientation 50A is defined by establishing contact between first edge 35A and registration features 25A and 25B. Specifically, contact is established at registration points 64 and 66 on first edge 35A. In some example embodiments, each of the registration features 25 can include an indicator adapted to guide a positioning recording media 17B into a first orientation 50A that is suitable for imaging. In some example embodiments, recording media 17B is positioned in a random first orientation 50A on media support 12 and various image forming parameters of recording head 16 are adjusted to accommodate the random orientation. By way of non-limiting example, adjustments to the image forming parameters can include activation timings or adjustments to an inclination of recording head 16 relative to sub-scan axis 24. In some example embodiments, various sensors are employed to detect various points on various edges of recording media 17B to determine an orientation thereof.

In this example embodiment, recording media 17B is positioned with a first orientation 50A such that first edge 35A extends along a direction that is substantially parallel to sub-scan axis 24. In other example embodiments, recording media 17B is positioned with a first orientation 50A such that first edge 35A extends along a direction that is skewed relative to sub-scan axis 24.

In step 220, recording apparatus 10 is operated to form at least one image feature on recording media 17B while recording media 17B is positioned with first orientation 50A. In this example embodiment, the at least one image features includes first image feature 60 which comprises a form suitable for determining the presence of image distortion that may require a change in a calibration of recording apparatus 10. In this example embodiment, first image feature 60 comprises a form suitable for determining the presence of main-scan image distortion that may have arisen after a previous calibration of recording apparatus 10. In this example embodiment, it is desired that recording apparatus 10 be operated to form an elongate first image feature 60 that extends along a direction substantially parallel to sub-scan axis 24. In this example embodiment, various activations timing and movement corrections as established in a previous calibration (e.g. calibration method 100) are made during the formation of first image feature 60 to correct for image distortions that were previously identified.

Recording apparatus 10 can be operated in various manners to form first image feature 60. For example, various portions of first image feature 60 can be formed during a plurality of helical scans produced with a coordinated movement of both media support 12 and recording head 16. Alternatively, various portions of first image feature 60 can be formed during a plurality of ring-like or circular scans, wherein each scan is produced while recording head 16 remains stationary at a fixed sub-scan location and media support 12 is rotated in a main-scan direction. Other image forming techniques can include sub-scan scanning techniques in which media support 12 is maintained in desired main-scan position while recording head 16 is translated along sub-scan axis 24 while forming a portion of first image feature 60. As shown in FIG. 7A, first image feature 60 is formed in accordance with image data 37A in this example embodiment of the invention.

As shown in FIG. 7A, image distortions are present in the formed first image feature 60. Specifically, first image feature 60 is shown comprising a curved form (i.e. exaggerated for clarity) rather than its intended straight elongate form, thereby indicating that new imaging corrections are required. It is understood that the illustrated curved distortion is provided by way of example only and other distorted shapes are possible. In this example embodiment, the distortions in first image feature 60 are to be detected by sensor 52 in step 250.

In some embodiments of the invention, one or more sensors 52 are located on support 20 at various sub-scan positions suitable for detecting various image features or portions thereof. In this example embodiment of the invention, sensor 52 is mounted on carriage 18 in a predetermined alignment with recording head 16. Sensor 52 is operable to detect various portions of first image feature 60 as motion system 22 controls the positioning of carriage 18 and media support 12 at locations suitable for the detection of these portions. For example, referring to FIG. 7A, various portions of first image feature 60 can be detected by sensor 52, which is positioned at appropriate detection locations on the path traveled by carriage 18. Various encoder/sensor signals provided by motion system 22 can be used to determine a position of carriage 18 relative to portion of first image feature 60. In various embodiments of the invention, information describing a position or orientation of each of the various portions of first image feature 60 is determined by controller 30 from various signals from motion system 22 and sensor 52.

Although carriage 18 can be operated to position sensor 52 at various sub-scan positions, this operation is not necessarily conducive to detecting distortions in first image feature 60. In manners similar to those previously described in conjunction with FIGS. 5A, 5B, and 5C, distortions in first image feature 60 can be caused by a change in a positioning and/or orientation of recording head 16 as recording head 16 is positioned at various locations along a deviated sub-scan movement path during the formation of first image feature 60. This change in the positioning of recording head 16 can be caused by different factors including creep in support 20. It is to be noted, however, that since sensor 52 is also located on carriage 52, it would also travel along a sensor movement path 54 (not shown in FIG. 7A) that is substantially the same as the deviated sub-scan movement path that recording head 16 traveled along during the formation of distorted first image feature 60.

Figure 8:
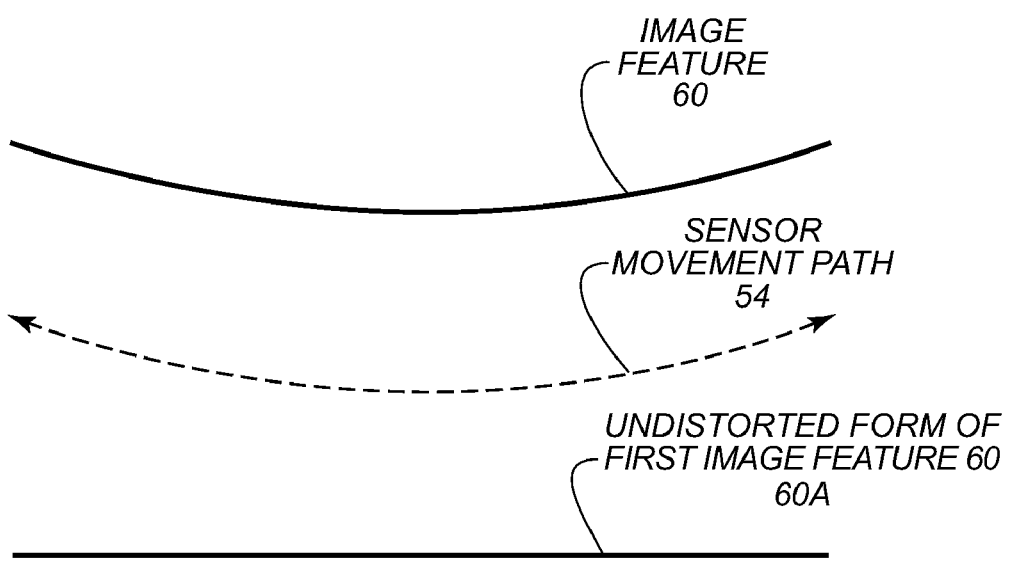
FIG. 8 schematically shows an erroneous determination of distortion in the image feature of FIG. 7A arising from the detection of the various portions of the first image feature with sensor that is moved along a path that is substantially parallel to the distorted form of the first image feature.

The consequence of this sensor movement along sensor movement path 54 is schematically depicted in FIG. 8. FIG. 8 shows a sensor movement path 54 that is approximately parallel to the shape of the distorted first image feature 60 that was formed when recording media 17B was positioned with first orientation 50A. As previously stated, various portions of first image feature 60 can be detected by sensor 52 as sensor 52 is moved to various locations along sensor movement path 54. Various information including main-scan positional information for each detected portion of the distorted first image feature 60 can be provided to controller 30 to identify a position of each of the portions. However, since sensor 52 is positionally shifted at each detection location by an amount related to a main-scan positional variation of the detected portion of distorted first image feature 60, the main-scan positional information provided to controller 30 is such that controller 30 would incorrectly interpret that distorted first image feature 60 comprises a substantially undistorted form 60A as schematically shown in FIG. 8. Such a result would erroneously imply that a recalibration of recording apparatus 10 is not needed. A similar result could occur if a series of sensors 52 were affixed at various sub-scan locations on support 20 since the positioning of various ones of the sensors 52 on support 20 could also vary in conjunction with changes in recording apparatus 10 that lead to the distortions in first image feature 60.

In this example embodiment of the invention, recording media 17B is repositioned on media support 12 to reduce occurrences of the aforementioned detection problems. In step 240, recording media 17B is positioned on media support 12 with a second orientation 50B that is different from the first orientation 50A. In this example embodiment, recording media 17B is positioned on media support 12 with the second orientation 50B after first image feature 60 has been formed on recording media 17B. As shown FIG. 7C, prior to the detection of various distortions in first image feature 60, recording media 17 was repositioned on media support 12 such that a second edge 36A was positioned in the vicinity of registration features 25. In this example embodiment, second edge 36A is an edge of recording media 17B that is transversely aligned to first edge 35A. In this regard, the second orientation 50B of recording media 17B on media support 12 represents a rotation of recording media 17B with respect to first orientation 50A. In this example embodiment of the invention, this representative rotation is made about an axis that intersects cylindrical surface 13 along a direction that is substantially perpendicular to cylindrical surface 13. In this example embodiment, this representative rotation is approximately 90 degrees while in other embodiments the representative rotation can fall with a range of approximately 85 degrees to 95 degrees. Factors such as non-perpendicularity between first edge 35A and second edge 36A can cause variations in the representative rotation.

In some example embodiments of invention, recording media 17B is repositioned while maintaining contact with a media support 12. In other example embodiments, recording media 17 is removed from a media support 12 prior to being positioned on the media support 12 with second orientation 50B. In some example embodiments, recording media 17B can undergo one or more other steps prior to being positioned on media support 12 with second orientation 50B. These other steps can subject recording media 17B to various processes that can include, for example: mechanical, thermal or chemical modification of a surface of recording media 17B. Some of these processes can be used to enhance a contrast between an imaged region of recording media 17B and a region of recording media 17B that has not been imaged.

In this example embodiment of the invention, recording media 17B is positioned on media support 12 to allow sensor 52 to successfully detect distortion in first image feature 60. By positioning recording media 17B on media support 12 with second orientation 50B, occurrences of the aforementioned erroneous results can be reduced. In this example embodiment of the invention, second orientation 50B corresponds to a positioning of first image feature 60 at location on media support 12 where undesired deviations in a positioning of sensor 52 can be reduced during the detection of first image feature 60.

Figure 7B:
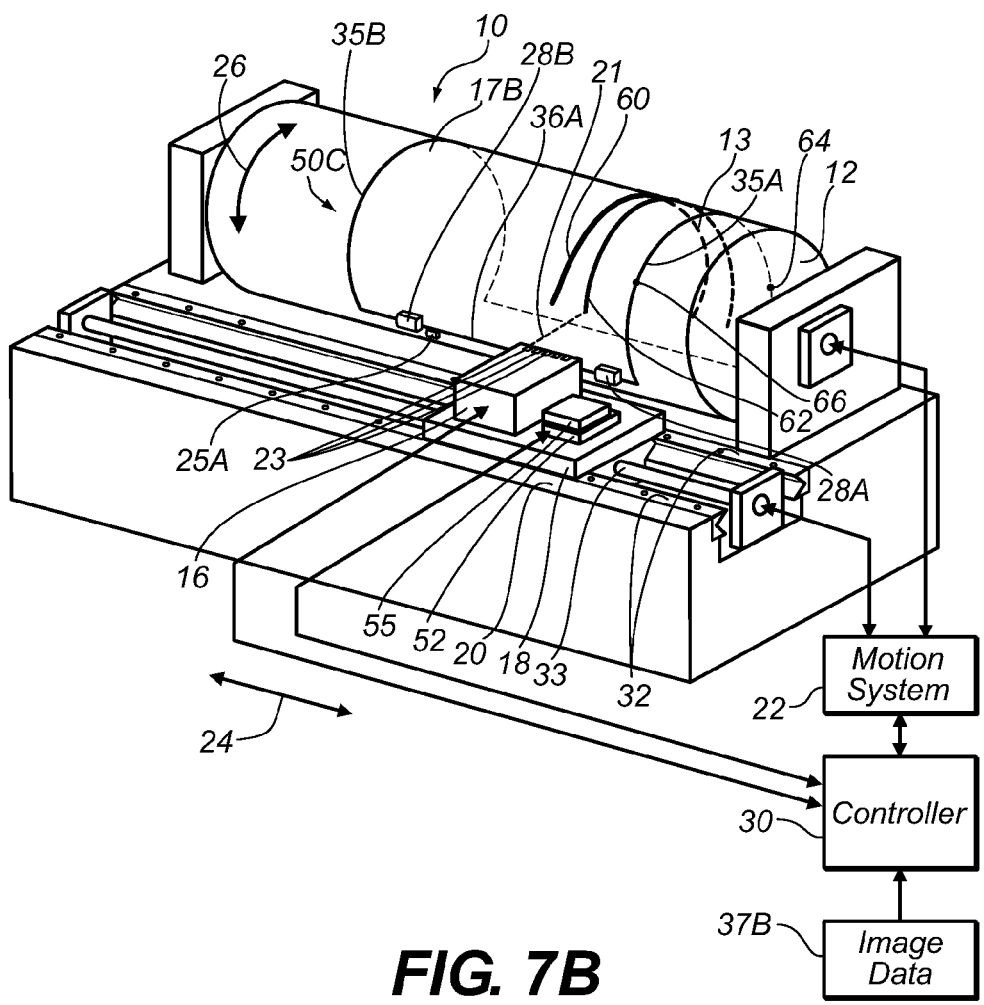
FIG. 7B shows an example embodiment of the invention which includes the formation of a second image feature on the recording media of FIG. 7A as positioned on the media support of the recording apparatus of FIG. 1 with an orientation that is different from the first orientation.
Figure 7C:
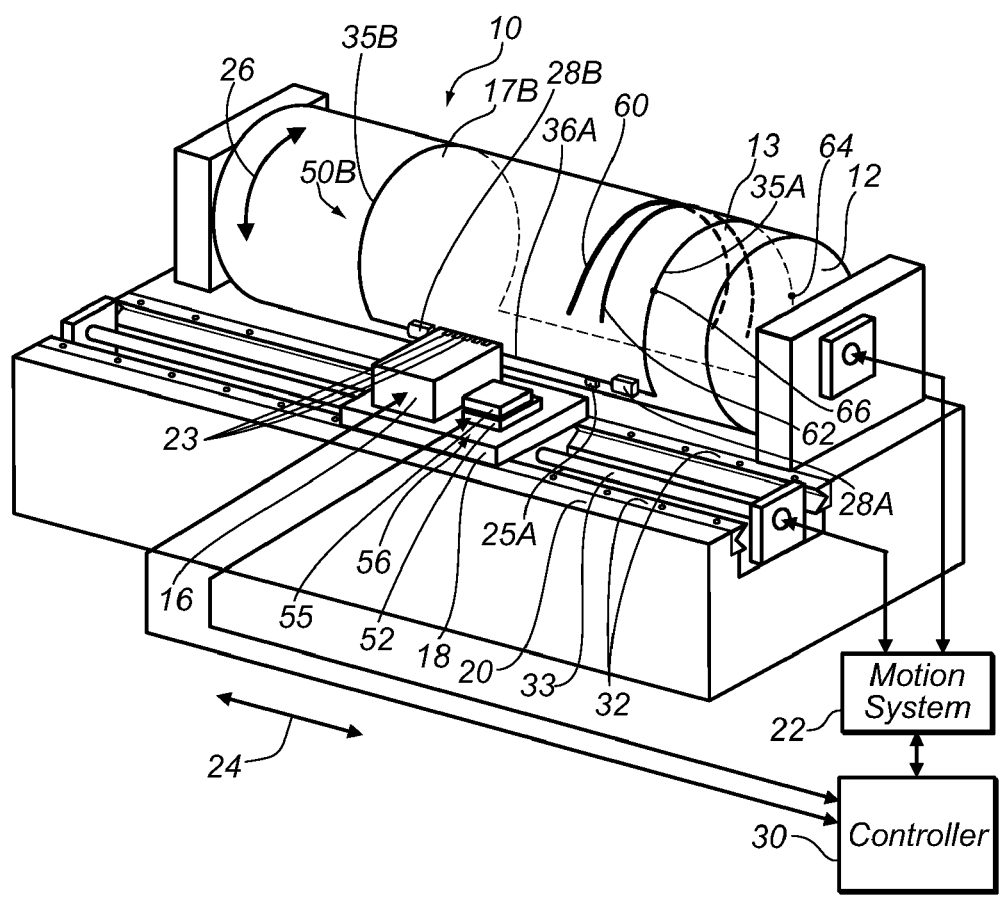
FIG. 7C shows an example embodiment of the invention in which distortion in the first image feature of FIG. 7A is detected while the recording media is positioned on the media support of the recording apparatus of FIG. 1 with a second orientation that is different from the first orientation.

As represented in FIG. 7C, sensor 52 is positioned at a first sub-scan position 56 and media support 12 is moved along a direction of main-scan axis 26 to successively position various portions of first image feature 60 at a location suitable for detection by sensor 52. In this example embodiment of the invention, sensor 52 is maintained at the first sub-scan position 56 during the detecting. In this example embodiment, the movement of media support 12 along main-scan axis 26 is less susceptible to deviations than the movement of carriage 18 along sub-scan axis 24 which lead to the distortions in first image feature 60. In this particular embodiment, media support 12 is a cylindrical member that is rotationally coupled to support 20 via rotational bearings (not shown). Suitable rotational bearings can include various precision deep groove ball bearings, various precision angular contact bearings, and various precision self-aligning bearings, for example. These rotational bearings typically allow for the minor amounts of shaft misalignment that can arise from various changes in recording apparatus 10 that cause the distortions in first image feature 60. In this regard, the movement of media support 12 along main-scan axis 26 is less susceptible to deviations than the movement of recording head 16 along sub-scan axis 24. Accordingly, in this example embodiment of the invention, the positioning of recording media 17B with second orientation 50B allows sensor 52 to detect each of the various portions of first image feature 60 as well as the overall distortion in the first image feature 60 itself In some example embodiments of the invention, sensor 52 detects distortions in first image feature 60 by detecting variances in an expected position of each detected portion of first image feature 60. After recording media 17B is positioned according to second orientation 50B, variances in an expected sub-scan position of each portion of first image feature 60 would be detected as media support 12 is rotationally moved to locate each of the image feature portions at location suitable for detection by sensor 52. The detected sub-scan positional variances of the various portions of first image feature 60 as positioned according to second orientation 50B are related to the main-scan distortions of the various portions of first image feature 60 as positioned according to first orientation 50A.

In some example embodiments of the invention, sensor 52 detects distortions in first image feature 60 by detecting sub-scan displacements between various portions of first image feature 60 as each portion is moved within the detectable range of sensor 52. In this example embodiment, the detected sub-scan displacements of the various portions of first image feature 60 as positioned according to second orientation 50B are related to the main-scan displacements of the various portions of first image feature 60 as positioned according to first orientation 50A. In some example embodiments, these sub-scan displacements are referenced to first sub-scan position 56. The presence of a varying displacement between each detected portion of first image feature 60 relative to one another or to first sub-scan position 56 can be used to identify distortions. However, it should be noted that some errors can be encountered when the second orientation 50B of recording media 17B is such that first image feature 60 extends along a direction that is skewed relative to main-scan axis 26. In various example embodiments, the detecting occurs along a detection path established by the movement of media support 12 along a direction of main-scan axis 26. If second orientation 50B is such that first image feature 60 is skewed with respect to this detection path, then any varying displacements between detected portions of first image feature 60 can include contributions from this skew.

In some example embodiments the detected sub-scan displacements are referenced to a detectable reference such as first edge 35A as positioned according to second orientation 50B. Since first edge 35A was aligned with first and second registration features 25A and 25B during the formation of first image feature 60 in step 220, there exists a corresponding alignment between first image feature 60 and first edge 35A and the detection of a varying spacing between the two can be used to identify the presence of distortion in first image feature 60. Some errors can, however, still be encountered when first edge 35A is itself not straight in form. Many recording media 17 can comprise wavy edges especially when the media are large in size or are made from materials that are not dimensionally stable.

In this example embodiment of the invention, the detected sub-scan displacements are referenced to a second image feature 62 formed in step 230 in accordance with image data 37B. As shown in FIG. 7B, image feature 62 is formed by recording head 16 on recording media 17B which is positioned on media support 12 with an orientation 50C that is different from the first orientation 50A that was used during the formation of first image feature 60. In this example embodiment, second image feature 62 is an elongate image feature that is adjacently positioned to first image feature 60. In this example embodiment, second image feature 62 comprises substantially a same length as first image feature 60 and is formed such that it extends along a direction that is substantially the same as the direction that first image feature 60 extends along. For clarity, recording media 17B including first image feature 60 and second image feature 62 is shown in an unwrapped or flat orientation in FIG. 7F.

In this example embodiment of the invention, second image feature 62 is formed in an aligned relationship with the two registration points 64 and 66 on first edge 35A that were employed during the formation of first image feature 60. First image feature 60 was previously formed while recording media 17B was positioned with a first orientation 50A that was defined by establishing contact between registration points 64 and 66 and corresponding registration features 25A and 25B. Accordingly, first orientation 50A was such that first image feature 60 was formed in an aligned orientation with the two points of contact. It is to be noted that in this example embodiment, a datum line (not shown) between the two points of contact is substantially parallel to sub-scan axis 24 when recording media 17B was positioned with first orientation 50A. In other example embodiments, registration features 25A and 25B can be located on media support 12 in a manner in which a datum line between the points of contact would be skewed with respect to sub-scan axis 24.

In this example embodiment of the invention, it is desired that second image feature 62 also be formed in the same alignment with the two registration points 64 and 66 that were previously employed during the formation of first image feature 60. In this example embodiment it is also desired that second image feature 62 be formed in a manner that reduces the possibility of distortions being formed in second image feature 62. In this example embodiment, the main-scan rotational movement is less prone to deviations than sub-scan translational movement. In this example embodiment, second image feature 62 is preferably formed with little or no movement of recording head along sub-scan axis 24.

As previously stated, orientation 50C employed during the formation of image feature 62 is different from first orientation 50A employed during the formation of first image feature 60. In some example embodiments, orientation 50C is the same as the second orientation 50B employed during the distortion detection in step 250, while in other example embodiment, orientation 50C is different from second orientation 50B. In this example embodiment, orientation 50C is such that first edge 35A extends circumferentially around media support 12. In some example embodiments, orientation 50C may be such that first edge 35A extends along a direction that is skewed relative to main-scan axis 26 by a minor angular rotation that typically ranges within +/−15 degrees. In either case, when the first edge 35A is so oriented, it can be viewed as extending substantially circumferentially around media support 12.

Once recording media 17B is positioned with orientation 50C, a location of each of the first and second registration points 64 and 66 is determined prior to forming second image feature 62 in the desired alignment with these points. Various techniques can be employed to determine the registration points 64 and 66 in this orientation. For example, U.S. Pat. No. 6, 968,782 (Cummings) and U.S. Pat. No. 7,456, 379 (Neufeld et al.), both of which are herein incorporated by reference, disclose various detection techniques that can be employed to find various points along an edge of a media that extends substantially circumferentially around a drum-like media support. In this regard various sensors can be used to detect the location of registration points 64 and 66, especially when orientation 50C is skewed relative to main-scan axis 26. In this example embodiment, sensor 52 is employed to detect the locations of registration points 64 and 66.

In this example embodiment, once the main-scan and sub-scan locations of each of the registration points 64 and 66 are determined, recording apparatus 10 is operated to form second image feature 62 in the desired alignment with the determined locations of registration points 64 and 66. Second image feature 62 can be formed in various manners. In some example embodiments, second image feature 62 is formed while operating recording apparatus 10 to circularly scan over recording media 17B. In other example embodiments of the invention, second image feature 62 is formed while operating recording apparatus 10 to helically scan over recording media 17B. In some example embodiments, image data 37B representative of second image feature 62 is adjusted to account for skew between the main-scan axis 26 and a datum line (again not shown) defined by the two registration points 64 and 66. In some example embodiments, second image feature 62 is formed while moving each of the recording head 16 and media support 12 in a coordinated manner governed by skew between the main-scan axis 26 and a datum line (again not shown) defined by the two registration points 64 and 66. For minor amounts of skew, this coordinated movement can include a minor amount of movement of recording head 16 along sub-scan axis 24. This minor sub-scan movement is typically smaller than the sub-scan movement that would be employed to form a helical image swath.

Once second image feature 62 is formed on recording media 17B with the desired alignment to a datum line defined by the two registration points 64 and 66, sensor 52 detects distortions in first image feature 60 in step 250 by detecting variances in an expected sub-scan separation between various corresponding portions of first image feature 60 second image feature 62 as each of these corresponding portions are moved within the detectable range of sensor 52. Since second image feature 62 has been formed with substantially the same alignment with registration points 64 and 66 that first image feature 60 was formed with, any variances between the detected sub-scan separations of the corresponding portions are related to the main-scan distortions imparted onto first image feature 60 during its formation. Signals comprising information pertaining to the detected sub-scan separations are provided to controller 30.

During step 260, controller 30 is configured to determine distortion information from detection information provided by sensor 52. In particular, controller 30 is configured to transform the detected sub-scan separation information back to a main-scan reference frame employed in the image-forming actions of step 220. Transformations can be made on the basis of various factors including: the previous location of recording media 17B on media support 12 during the formation of first image feature 60 and the amount and direction of various detected separations. In this example embodiment, controller 30 is configured to transform main-scan positional information regarding the location of various detected distorted regions of first image feature 60 positioned according to second orientation 50B back to a sub-scan reference frame employed in the image-forming actions of step 220. Various encoder information provided by motion system 22 can be employed by controller 30 in the determination of various positional information.

Recording apparatus 10 is recalibrated in step 270. New imaging corrections or adjustments to various previously formed imaging corrections are made in accordance with the determined information pertaining to distortion in first image feature 60. In this regard, controller 30 determines the magnitude and direction of any distortions in the determined information and correlates them to sub-scan positional information regard the location of the distortions. If the distortions are of a sufficient magnitude to require a recalibration of recording apparatus 10, controller 30 adjusts previously determined imaging corrections in accordance with the determined values representing these distortions. Since first image feature 60 was formed to identify main-scan imaging distortions, controller 30 is configured to alter activation timing changes in regions of media support 12 corresponding to the distortions. In this regard, the activation timing of various recording channels 23 are adjusted when recording head 16 is positioned to image portions of a subsequent image in the regions corresponding to the distortions in first image feature 60.

Advantageously, the recalibration of recording apparatus 10 can be performed at the point of use. Recalibration can be performed without the need of additional dedicated calibration equipment. In some example embodiments of the invention, controller 30 maintains data representative of the various adjustments made to the imaging corrections to establish a log. Such logs can be used to identify conditions that can improve the image quality of the system.

It is understood that the various steps illustrated in method 200 are exemplary in nature and other sequences of these steps, or the addition of additional steps, or the modification of these steps can be employed by various example embodiments of the invention. For example, second image feature 62 may be formed prior to the formation of first image feature 60. It is understood that in some embodiments of the invention, a plurality of image features can be formed to detect main-scan distortion instead of a single image feature (e.g. first image feature 60). For example, first image feature 60 can be replaced by a pattern of image features and distortion can be detected by detecting variance in an expected position of one or more of the features when recording media 17B is positioned with second orientation 62. In some example embodiments, first image feature 60 can be replaced by a pattern of image features and distortion can be detected by detecting variance in an expected separation between one or more of the features and the second image feature 62 when recording media 17B is positioned with the second orientation 62. In some example embodiments, both of first image feature 60 and second image feature 62 can each be replaced by a grouping of image features and distortion can be detected by detecting variance in an expected separation between various corresponding features in each grouping when recording media 17B is positioned with second orientation 50B.

Media support 12 can comprise size attributes along various ones of main-scan axis 26 and sub-scan axis 24 which impose limitations on the size of a suitable recording media 17B that can be handled in accordance with various embodiments of the present invention. For example, a limited circumferential distance around media support 12 may impose limitations on the size of recording media 17B that can be repositioned between first orientation 50A and second orientation 50B. Accordingly, in some example embodiments, methods similar to method 200 are practiced at various sub-scan locations of media support 12 to determine imaging corrections of various regions associated with each of those sub-scan locations.

In some example embodiments, the repositioning of recording media 17B between first orientation 50A and second orientation 50B may correspond to a representative rotation that is different from that illustrated in FIGS. 7A and 7C. For example, recording media 17B can be repositioned from first orientation 50A to another orientation where edge 35B (i.e. the edge of recording media 17B that opposes first edge 35A) is aligned with registration features 25. In this example embodiment, the representative rotation would typically correspond to a rotation angle in the range of approximately 175 degrees to 185 degrees. If recording media 17B is sufficiently transparent, it can be additionally reversed such that its imaged surface is brought into contact with cylindrical surface 13. After moving media support 12 to bring the repositioned first image feature 60 within a detection range of sensor 52, distortion in the first image feature 60 can be detected while positioning sensor 52 at various locations along sub-scan axis. In these example embodiments, the detected distortions would correspond to approximately twice the actual distortions in first image feature 60 since sensor 52 is moved along a sensor movement path 54 that substantially mirrors the distortion in first image feature 60.

In some example embodiments, an additional image feature is formed while recording media 17B is positioned with an orientation that is different from first orientation 50A and which is selected to minimize the formation of distortion in the additional image feature (e.g. orientation 50C). Main-scan distortions can be directly detected by sensor 52 when the recording media 17B is positioned in an orientation such that both the first image feature 60 and the additional image feature extend along a direction that is substantially parallel to sub-scan axis 24. Distortion detection in these embodiments can be realized by detecting variances in an expected separation between various corresponding portions of the first image feature 60 and the additional image feature as sensor 52 is moved along its sub-scan path. It is understood that the extension of the first image feature 60 and the additional image feature along a direction that is substantially parallel to sub-scan axis 24 can include minor amounts of skew relative to sub-scan axis 24 when recording media 17B is positioned in the detection orientation.

Figure 7D:
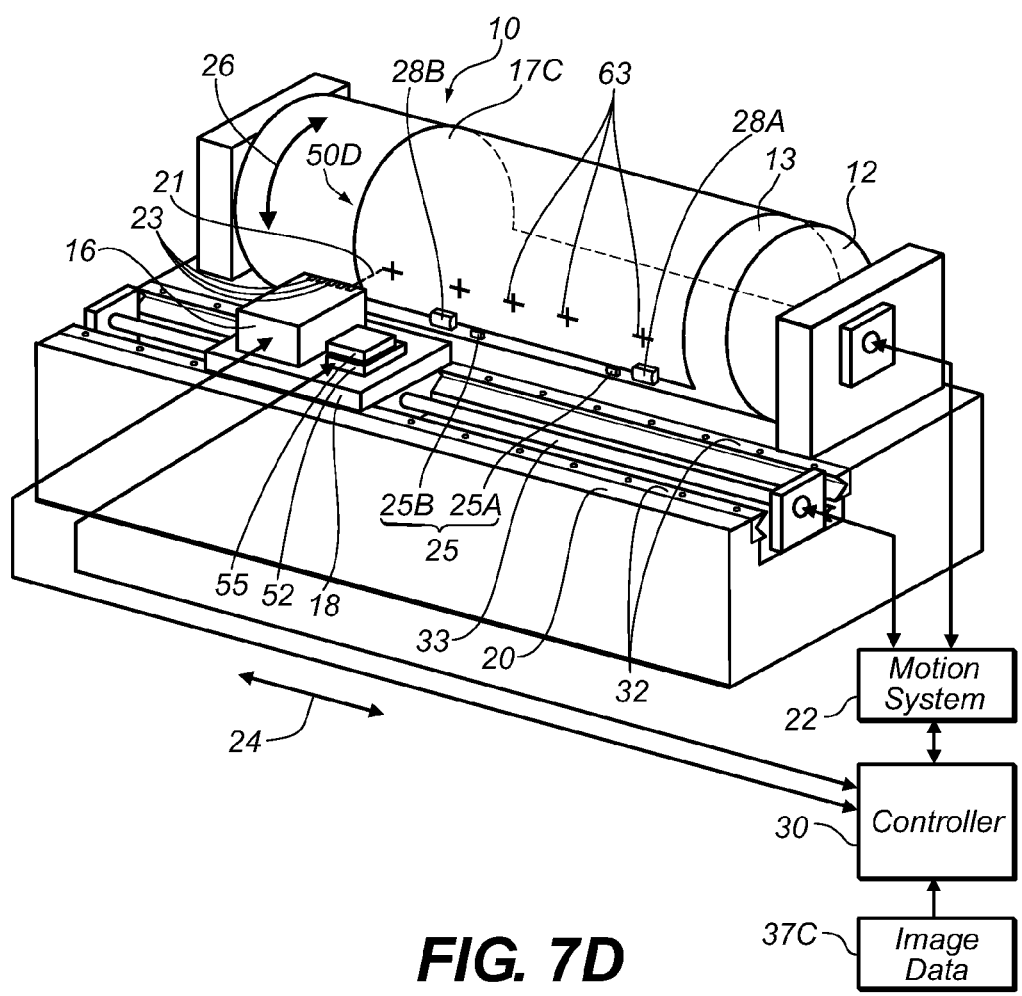
FIG. 7D shows an example embodiment of the invention which includes the formation of a pattern of image features on a recording media positioned with a first orientation on the media support of the recording apparatus of FIG. 1.

In some example embodiments, sub-scan distortions are detected. For example as shown in FIG. 7D, a pattern of image features 63 can be formed on a recording media 17C which is positioned with a first orientation 50D on media support 12. In this example embodiment, first orientation 50D is established by methods similar to those employed to establish previously described first orientation 50A. The pattern of image features 63 can include various one dimensional and two dimensional patterns. The pattern of image features 63 can include various arrangement directions along which the image features 63 are arranged. The various arrangement directions can be oriented relative to main-scan axis 26 and sub-scan-axis 24. It is understood that orientation of the various arrangement directions will change if recording media 17C is repositioned on media support 12 with an orientation different from first orientation 50D. In this example embodiment, the pattern of image features 63 comprises a row of the image features 63 that are to be formed with an arrangement direction generally parallel to a direction of sub-scan axis 24. In various example embodiments, it is desired that the row of image features 63 be formed with target sub-scan separations between various pairs of the image features 63. In this non-limiting example embodiment, it is desired that adjacent image features 63 be formed with substantially equal target sub-scan separations. FIG. 7D shows that various sub-scan distortions have led to variances in the desired target sub-scan separations between various ones of the formed image features 63. The pattern of image features 63 are formed in accordance with image data 37C.

Figure 7E:
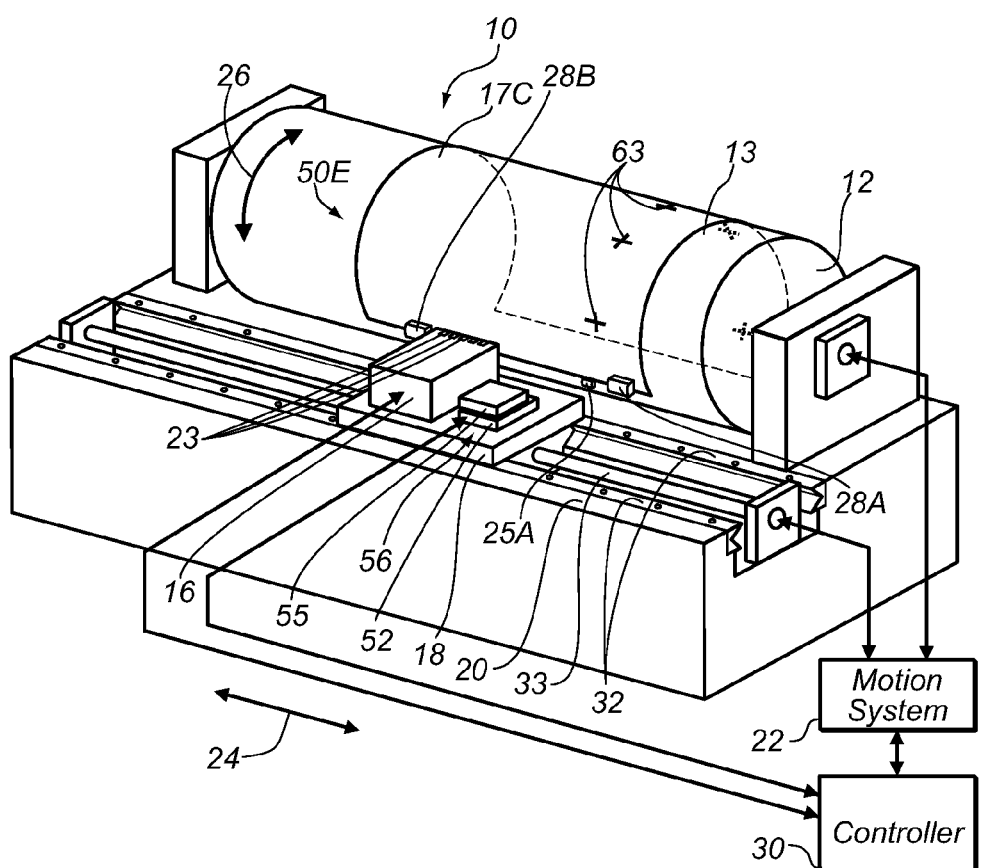
FIG. 7E shows an example embodiment of the invention in which distortion in the pattern of image features of FIG. 7D is detected while the recording media is positioned on the media support of the recording apparatus of FIG. 1 with a second orientation that is different from the first orientation.
Figure 7F:
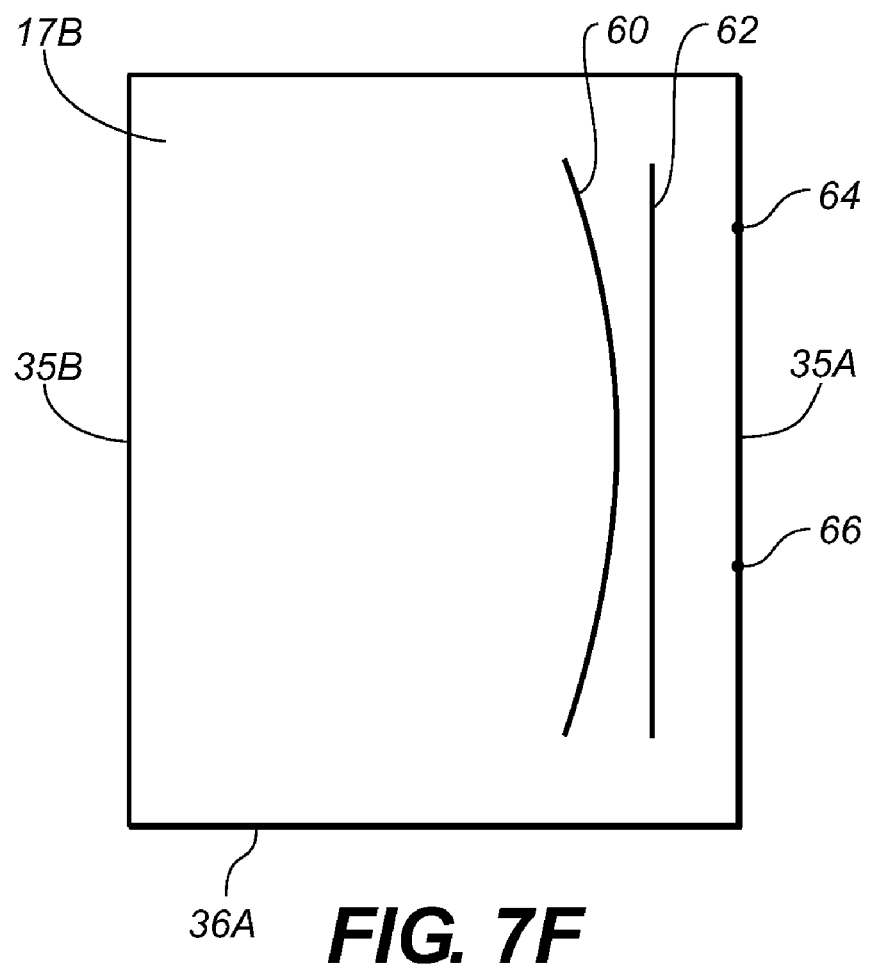
FIG. 7F shows the first image feature and the second image feature on the recording media of FIG. 7B as shown in an unwrapped or flat orientation.

Once the pattern of image features 63 is formed, recording media 17C is repositioned with second orientation 50E as shown in FIG. 7E. Second orientation 50E is different from first orientation 50D and is selected for the detection of any changes between the actual separations between the various image features 63 and their corresponding target separations.

Various detection errors could occur if sensor 52 were employed to detect variance in an expected separation between a first image feature and a second image feature in the pattern of image features 63 while recording media 17C is positioned on media support 12 with first orientation 50D. For example, various carriage yawing movements (e.g. as shown in FIG. 5C) which contribute to variances in the expected separation between two of the image features 63 can also subject sensor 52 to the same pointing errors since sensor 52 is also moved by carriage 18 during the detection. By positioning recording media 17C on media support 12 with second orientation 50E, occurrences of the aforementioned erroneous results can be reduced. In this example embodiment, second orientation 50E is established by methods similar to those employed to establish previously described second orientation 50B. As such, second orientation 50E is such that the row of image features 63 now extends along a substantially circumferential direction. Accordingly, the arrangement direction of the image features in the pattern of image features 63 is reoriented when recording media 17C is positioned according to second orientation 50E. Since the main-scan rotational movement of media support 12 is less prone to deviations than sub-scan translational movement of carriage 18, variance between an expected separation between two of the image features 63 can be accurately detected as media support 12 is rotated to position each of the image features 63 to a location suitable for detection by sensor 52. It is understood that the row of image features 63 can be positioned along a substantially circumferential direction that can include a minor amount of skew relative to main-scan axis 26 when recording media 17C is positioned according to second orientation 50E.

In this example embodiment, any detected variances are representative of sub-scan distortions that have manifested themselves within recording apparatus 10. Imaging corrections, including adjustments in a movement parameter of carriage 18 (e.g. a speed parameter) can be made to compensate for these distortions. In some example embodiments, adjustments in the positioning of carriage 18 are made at various sub-scan locations corresponding to the distortion regions. In this example embodiment, speed adjustments to carriage 18 are made at various points along its path of travel. In this example embodiment, these various points correspond to the position of recording head 16 during the formation of the various distortions. The location of these points can be identified by techniques similar to those incorporated by other described embodiments of the invention. Accordingly carriage 18 may be moved with different speeds at different points along its path of travel. It is understood that speed changes are typically small in nature, but are of a magnitude sufficient to overcome the detected distortions.

In some example embodiments, changes in an expected separation can be detected between various members of a plurality of image features 63 formed in a single image swath. In some cases, sub-scan distortions may be more prominent across a plurality image swaths rather than within a given image swath. In some example embodiments, at least one image feature 63 is formed during each scan and changes in an expected separation can be detected from image features 63 formed in different image swaths.

In some example embodiments of the invention, sub-scan distortions are detected by detecting a change in an expected position of one of the image features 63. Various encoder signals provided by motion system 22 can be employed to assist in the identification of a particular location of the detected image feature 63. In other example embodiments of the invention, sub-scan distortions are detected by detecting a change in an expected size of one of the image features 63. For example, each of the image features 63 can be formed in accordance with a desired sub-scan target size and deviations from this size can be used to identify the distortions. Deviations from the desired target size can occur from yawing movements of recording head 16 or movement irregularities of transmission member 33 for example.

In some example embodiments, one or more additional image features can be formed when recording media 17C is positioned with an orientation that is different from first orientation 50D. Distortion can be detected by detecting variance in an expected separation between one of the image features 63 and one of the additional image features when recording media 17C is positioned with the second orientation 50E. In some example embodiments, sub-scan variances in a position of an image feature 63 are determined after detecting a deviation in an expected main-scan separation between the image feature 63 and one of the additionally formed image features when recording media 17C is positioned with second orientation 50E.

In some example embodiment of the invention, the pattern of image features 63 is used determine both sub-scan and main-scan distortions. The pattern of image features can be formed while recording media 17C is positioned with a first orientation on media support 12 and associated main-scan and sub-scan distortions can be detected when the recording media 17C is positioned on media support 12 with a second orientation that is different from the first orientation. It is understood that suitable combinations of various aspects of different example embodiments are within the scope of the present invention. Various imaging corrections including carriage 18 movement adjustments and/or recording channel 23 activation timing adjustments made in accordance with various embodiments of the invention can be adopted during subsequent image forming actions undertaken by recording apparatus 10. Various carriage 18 movement adjustments and/or recording channel 23 activation timing adjustments made in accordance with various embodiments of the invention can be adopted during a subsequent movement of carriage 18.

Various image features formed in accordance with various embodiments of the present invention can comprise any form, size, shape or characteristic suitable for detection. Without limitation, various image features formed in accordance with various embodiments of the invention can include various targets, registration features or fiducials that are suitable for detection.

In various embodiments of the invention, sensor 52 can include any suitable sensor for detecting various distortions in one or more image features. Without limitation, sensor 52 can include optical, mechanical and electrical elements. In various example embodiment of the invention, sensor 52 includes an image capture device such as a CCD sensor or a CMOS sensor. Image capture sensors having appropriately sized fields of view can be employed to capture images of various portions of an image feature. Various signals from an image capture sensor can be used to define a position of a detected portion of an image feature. Additionally, signals (e.g. encoder signals) corresponding to a position of media support 12 and carriage 18 can be used in the determination of a main-scan position and/or sub-scan position of a given portion of an image feature as it is positioned in the field of view of an image capture sensor. In some example embodiments, sensor 52 may be part of an apparatus different from recording apparatus 10.

In some example embodiments of the invention, illuminator 55 is used to illuminate a portion of one or more image features during the detection of the image features. Illuminator 55 can be used to illuminate a portion of the one or more image features while an image of the portion is captured with an image capture device. In some example embodiments of the invention, illuminator 55 includes a source of radiation that can emit radiation towards a recording media 17 to enhance a difference between a formed image feature and a bordering region of the recording media 17. Changes in the amount or direction of reflected radiation can be detected by sensor 52 to detect a particular portion of an image feature. In some example embodiments of the invention, illuminator 55 is an emitter of an emitter/receiver type sensor. In some example embodiments of the invention, illuminator 55 includes an LED light source. In some example embodiments of the invention, illuminator 55 includes a strobe light source. In some example embodiments, illuminator 55 is positioned on carriage 18. In some example embodiments, illuminator 55 is positioned on support 20.

The invention has been described in detail with particular reference to certain preferred embodiments thereof, but it will be understood that variations and modifications can be effected within the scope of the invention.

PARTS LIST 10 recording apparatus
12 media support
13 cylindrical surface
16 recording head
17 recording media
17A recording media
17B recording media
17C recording media
18 carriage
19 image
19A calibration image
20 support
21 imaging beams
22 motion system
23 recording channels
24 sub-scan axis
25 registration features
25A registration feature
25B registration feature
26 main-scan axis
27 yaw directions
28A clamp
28B clamp
29 pitch directions
30 controller
32 guide system
33 transmission member
35 first edge
35A first edge
35B edge
36 second edge
36A second edge
37 image data
37A image data
37B image data
37C image data
40 target image
41 target cells
42 imaged cells
42A imaged cell
42B imaged cell
42C imaged cell
50A first orientation
50B second orientation
50C orientation
50D first orientation
50E second orientation
52 sensor
54 sensor movement path
55 illuminator
56 first sub-scan position
60 first image feature
60A undistorted form
62 second image feature
63 image features
64 registration point
66 registration point
100 method
110 form calibration image
120 adjust recording apparatus to correct for distortions in calibration image
200 method
210 position recording media on media support with a first orientation
220 form image feature on recording media positioned with first orientation
230 form second image feature
240 position recording media with a second orientation that is different from the first orientation
250 detect distortion in image feature
260 determine distortion information
270 recalibrate recording apparatus

The invention claimed is:

1. A method for changing a calibration of a recording apparatus to adjust for geometric distortion, comprising:
providing a media support for receiving recording media;
providing a carriage adapted for moving along a path;
providing a recording head on the carriage;
operating the recording head to form a pattern of image features on the recording media while the recording media is positioned with a first orientation on the media support;
positioning the recording media with a second orientation on the media support, wherein the second orientation is different from the first orientation;
detecting distortion in the pattern of image features while the recording media is positioned with the second orientation on the media support; and
adjusting movement of the carriage in accordance with the detected distortion.

2. A method according to claim 1, wherein adjusting the movement of the carriage comprises adjusting a speed of the carriage.

3. A method according to claim 1, comprising forming the pattern of image features on the recording media while operating the carriage to move the recording head along a path.

4. A method according to claim 1, comprising operating the recording head to form the pattern of image features such that the pattern of image features includes an arrangement direction that is substantially parallel to a direction of a path when the recording media is positioned with the first orientation.

5. A method according to claim 4, wherein the arrangement direction is reoriented when the recording media is positioned with the second orientation on the media support, and detecting the distortion in the pattern of image features comprises detecting the distortion in the pattern of image features along the arrangement direction while the recording media is positioned with the second orientation on the media support.

6. A method according to claim 4, wherein the arrangement direction is reoriented when the recording media is positioned with the second orientation on the media support, and detecting the distortion in the pattern of image features comprises detecting a change in an expected position of at least one of the image features along the arrangement direction while the recording media is positioned with the second orientation on the media support.

7. A method according to claim 4, wherein the arrangement direction is reoriented when the recording media is positioned with the second orientation on the media support, and detecting the distortion in the pattern of image features comprises detecting a change in an expected size of at least one of the image features along the arrangement direction while the recording media is positioned with the second orientation on the media support.

8. A method according to claim 4, wherein the arrangement direction is reoriented when the recording media is positioned with the second orientation on the media support, and detecting the distortion in the pattern of image features comprises detecting a change in an expected separation along the arrangement direction between a first image feature and a second image feature of the pattern of image features while the recording media is positioned with the second orientation on the media support.

9. A method according to claim 8, comprising forming the pattern of features on the recording media while operating the recording head to scan over the recording media a plurality of times, wherein each of the first image feature and the second image feature is formed during a different scan.

10. A method according to claim 1, wherein the media support includes a registration feature, and the method comprises positioning a first edge of the recording media in the vicinity of the registration feature while the recording media is positioned with the first orentation on the media support, and positioning a second edge of the recording media in the vicinity of the registration feature while the recording media is positioned with the second orientation on the media support, wherein the first edge is different from the second edge.

11. A method according to claim 10, wherein the second edge is transversely aligned with the first edge.

12. A method according to claim 1, comprising establishing relative movement between the recording head and the media support along a first direction while forming the pattern of image features on the recording media, and establishing relative movement between the recording head and the media support along a second direction while detecting the distortion in the pattern of image features, wherein the second direction is different from the first direction.

13. A method according to claim 3, comprising maintaining the carriage at a stationary location while detecting the distortion in the image feature.

14. A method according to claim 13, comprising providing a sensor on the carriage for detecting the distortion in the pattern of image features.

15. A method according to claim 1, wherein the second orientation of the recording media on the media support represents a rotation of the recording media with respect to the first orientation of the recording media on the media support.

16. A method according to claim 1, wherein the second orientation of the recording media on the media support corresponds to a change in the first orientation of the recording media on the media support created by rotating the recording media by a rotation angle about an axis that is substantially perpendicular to a surface of the recording media supported by the media support.

17. A method according to claim 16, wherein the rotation angle is within a range of 85 degrees to 95 degrees.

18. A method according to claim 1, comprising completely separating the recording media from the media support between the positioning of the recording media on the media support with the first orientation and the positioning of the recording media on the media support with the second orientation.

19. A method according to claim 1, comprising adjusting a contrast between an imaged portion of the recording media and an un-imaged portion of the recording media between the positioning of the recording media on the media support with the first orientation and the positioning of the recording media on the media support with the second orientation.

20. A method according to claim 1, comprising providing a sensor for detecting the distortion in the pattern of image features.

21. A method according to claim 3, comprising providing a sensor on the carriage, wherein the sensor is adapted for detecting the distortion in the pattern of image features.

22. A method according to claim 21, wherein the sensor includes an image capture device.

23. A method according to claim 21, comprising providing an illuminator on the carriage, wherein the illuminator is adapted for illuminating a portion of the pattern of image features while the distortion in the pattern of image features is detected.

24. A method according to claim 1, wherein adjusting the movement of the carriage in accordance with the detected distortion adjusts a position of the carriage along the path.

* * * * *